United States Patent
Lin et al.

(10) Patent No.: US 10,650,786 B2
(45) Date of Patent: May 12, 2020

(54) AUTOMATICALLY BRIGHTNESS ADJUSTING ELECTRONIC DEVICE AND BRIGHTNESS ADJUSTING METHOD THEREOF

(71) Applicant: ASUSTeK COMPUTER INC., Taipei (TW)

(72) Inventors: Chin-Hung Lin, Taipei (TW); Wei-Chung Hung, Taipei (TW); Huai-Hao Syu, Taipei (TW); Tzu-Ping Lin, Taipei (TW); Chia-Po Chou, Taipei (TW); Tsung-Lin Wu, Taipei (TW); Han-Wei Tang, Taipei (TW); Yi-Ching Chen, Taipei (TW); Chih-Lung Lin, Taipei (TW); Ping-Fu Hsieh, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 15/862,785

(22) Filed: Jan. 5, 2018

(65) Prior Publication Data
US 2018/0204540 A1    Jul. 19, 2018

(30) Foreign Application Priority Data
Jan. 17, 2017    (CN) .......................... 2017 1 0034458

(51) Int. Cl.
*G09G 5/10*    (2006.01)
*G09G 3/34*    (2006.01)
(Continued)

(52) U.S. Cl.
CPC .............. *G09G 5/10* (2013.01); *G06F 1/3206* (2013.01); *G06F 1/3218* (2013.01);
(Continued)

(58) Field of Classification Search
CPC ......... G09G 3/3406; G09G 2320/0626; G09G 2360/144; G06F 1/3218
See application file for complete search history.

(56) References Cited

U.S. PATENT DOCUMENTS

2007/0273613 A1   11/2007   Mu et al.
2008/0158113 A1*  7/2008   Ozawa ................. G09G 3/3406
                                                  345/77
(Continued)

FOREIGN PATENT DOCUMENTS

CN       1959795 A       5/2007
CN     101080124 A      11/2007
(Continued)

OTHER PUBLICATIONS

Office Action issued in corresponding Chinese patent application dated Jun. 5, 2019.

*Primary Examiner* — Shaheda A Abdin
(74) *Attorney, Agent, or Firm* — McClure, Qualey & Rodack, LLP

(57) ABSTRACT

An automatically brightness adjusting electronic device and a brightness adjusting method are provided. The method comprises: sensing an environmental light intensity; generating a brightness adjustment signal according to the environmental light intensity via a second control unit; and adjusting a display brightness of a display unit according to the brightness adjustment signal via a first control unit or the second control unit.

9 Claims, 3 Drawing Sheets

(51) Int. Cl.
*G06F 1/3218* (2019.01)
*G06F 1/3206* (2019.01)
*G06F 1/3234* (2019.01)

(52) U.S. Cl.
CPC ......... *G06F 1/3265* (2013.01); *G09G 3/3406* (2013.01); *G09G 2320/0626* (2013.01); *G09G 2360/144* (2013.01)

(56) References Cited

U.S. PATENT DOCUMENTS

2009/0109129 A1* 4/2009 Cheong .................. G09G 5/02
345/20
2014/0195328 A1* 7/2014 Ferens ............... G06Q 30/0271
705/14.41
2015/0243200 A1 8/2015 Pan

FOREIGN PATENT DOCUMENTS

| CN | 101211531 A | 7/2008 |
| CN | 102546902 A | 7/2012 |
| CN | 103425275 A | 12/2013 |
| CN | 104700815 A | 6/2015 |
| CN | 105162928 A | 12/2015 |
| WO | 2014107375 A1 | 7/2014 |

\* cited by examiner

AUTOMATICALLY BRIGHTNESS ADJUSTING ELECTRONIC DEVICE AND BRIGHTNESS ADJUSTING METHOD THEREOF

CROSS-REFERENCE TO RELATED APPLICATION

This application claims the priority benefit of CN application serial No. 201710034458.2, filed on Jan. 17, 2017. The entirety of the above-mentioned patent applications are hereby incorporated by references herein and made a part of specification.

BACKGROUND OF THE INVENTION

Field of the Invention

The disclosure relates to a device and a brightness adjusting method.

Description of the Related Art

Conventionally, the brightness of screens of conventional mobile electronic devices is unable to be adjusted automatically according to an environmental light. In a bright environment, the display information on the screen cannot be seen clearly if the brightness of the screen is not bright enough. Thus, the brightness of the screen should be adjusted. However, the adjusted brightness would become not proper again when the environment brightness changes, which affects eyesight of users.

BRIEF SUMMARY OF THE INVENTION

According to an aspect of the disclosure, an automatically brightness adjusting electronic device is provided. The automatically brightness adjusting electronic device comprises: a display unit with a display brightness; a sensing unit configured to sense an environmental light intensity; a first control unit coupled to the display unit; and a second control unit coupled between the display unit and the sensing unit; wherein the second control unit generates a brightness adjustment signal according to the environmental light intensity to enable the first control unit or the second control unit to adjust the display brightness according to the brightness adjustment signal.

According to an aspect of the disclosure, an automatically brightness adjusting electronic device is provided. The automatically brightness adjusting electronic device comprises: a display unit with a display brightness; a sensing unit configured to sense an environmental light intensity; a first control unit coupled to the display unit; a second control unit coupled to the first control unit and the sensing unit; and a switch circuit, coupled to the display unit and switched between the first control unit and the second control unit; wherein the second control unit generates a brightness adjustment signal according to the environmental light intensity to enable the first control unit or the second control unit to adjust the display brightness according to the brightness adjustment signal.

According to an aspect of the disclosure, a brightness adjusting method is provided. The brightness adjusting method comprises: sensing an environmental light intensity; generating a brightness adjustment signal according to the environmental light intensity via a second control unit; and adjusting a display brightness of a display unit according to the brightness adjustment signal via a first control unit or the second control unit.

BRIEF DESCRIPTION OF THE DRAWINGS

These and other features, aspects and advantages of the invention will become better understood with regard to the following embodiments and accompanying drawings.

DETAILED DESCRIPTION OF THE EMBODIMENTS

Figure 1:
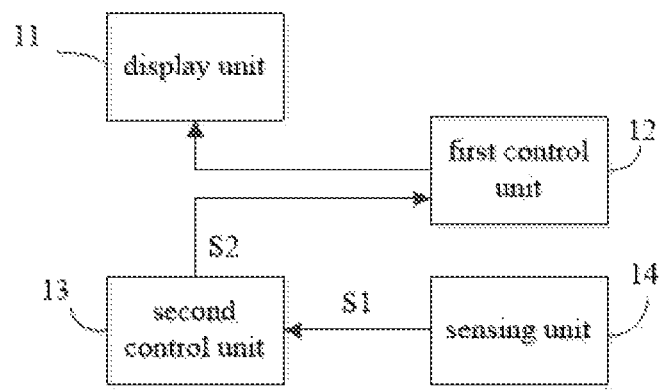
FIG. 1 is a circuit block diagram of an automatically brightness adjusting electronic device according to an embodiment.
Figure 2:
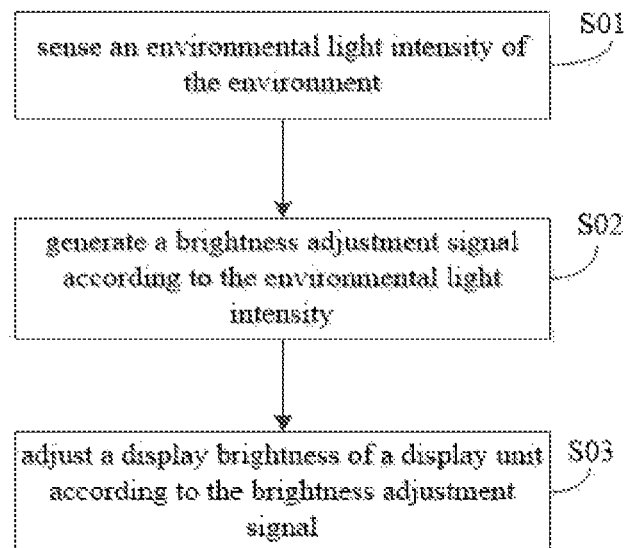
FIG. 2 is a flow chart of a brightness adjusting method according to an embodiment.

FIG. 1 is a circuit block diagram of an automatically brightness adjusting electronic device according to an embodiment. FIG. 2 is a flow chart of a brightness adjusting method according to an embodiment. Please refer to FIG. 1 and FIG. 2. An automatically brightness adjusting electronic device 1 includes a display unit 11, a first control unit 12, a second control unit 13 and a sensing unit 14. The second control unit 13 is coupled between the sensing unit 14 and the display unit 11. The first control unit 12 is coupled to the display unit 11. The power for operations of the first control unit 12 is larger than that for the second control unit 13. In an embodiment, the second control unit 13 is a microcontroller unit (MCU). The first control unit 12 is a system-on-a-chip (SoC) including multiple microcontroller units. In an embodiment, the first control unit 12 and the second control unit 13 are different control chipsets on a same system-on-a-chip.

The display unit 11 displays various display information. The display brightness of the display unit 11 is adjustable. The first control unit 12 or the second control unit 13 controls the display brightness of the display unit 11. Therefore, in the brightness adjustment process, as shown in FIG. 2, the sensing unit 14 senses an environmental light intensity of the environment (step S01). The second control unit 13 generates a brightness adjustment signal S2 according to the environmental light intensity (step S02). The first control unit 12 or the second control unit 13 adjusts the display brightness of the display unit 11 according to the brightness adjustment signal S2 (step S03).

In an embodiment, in step S01, the sensing unit 14 generates a sensing signal S1 representing an illumination value (lux) of the environmental light intensity according to the environmental light intensity, and sends the sensing signal S1 to the second control unit 13. In step S02, the second control unit 13 generates the brightness adjustment signal S2 according to the sensing signal S1. In detail, the second control unit 13 determines a brightness range (so called as "a first brightness range" hereinafter) corresponding to the illumination value of the environmental light intensity according to the sensing signal S1. Then, the second control unit 13 determines whether the first brightness range is the same as a brightness range corresponding to the current display brightness of the display unit 11 (so called as "a second brightness range" hereinafter), and determines whether a brightness adjustment signal S2 needs to be generated according to the determining result. When the second control unit 13 determines that the first brightness range and the second brightness range are the same, for example, the two brightness ranges are both within the range from 1000 lux to 1500 lux, the second control unit 13 determines not to adjust the display brightness of the display unit 11. The second control unit 13 does not generate the brightness adjustment signal S2. When the second control unit 13 determines that the first brightness range is different from the second brightness range, for example, the first brightness range is within a brightness range from 1000 lux to 1500, and the second brightness range is within a brightness range from 0 lux to 100 lux, the second control unit 13 determines to adjust the display brightness of the display unit 11. The second control unit 13 generates the brightness adjustment signal S2 to enable the first control unit 12 or the second control unit 13 to adjust the display brightness according to the brightness adjustment signal S2.

In an embodiment, the display unit 11 includes a backlight module. The backlight module is coupled to the first control unit 12 or the second control unit 13. The backlight module generates light with different brightness by the control of the first control unit 12 or the second control unit 13. For example, when the illumination value of the environmental light intensity represented by the sensing signal S1 is in a bright range of 0 to 101 lux, the brightness adjustment signal S2 enables the first control unit 12 or the second control unit 13 to control backlight module to generate a light source with a minimum intensity. At the time, the display brightness of the display unit 11 is the darkest. When the illumination value of the environmental light intensity is within a brightness range larger than 100000 lux, the brightness adjustment signal S2 enables the first control unit 12 or the second control unit 13 to control the backlight module to generate a light source with a maximum intensity. At the time, the display brightness of the display unit 11 is the brightest. When the illumination value of the environmental light intensity is within a brightness range from 101 lux to 100000 lux, the brightness adjustment signal S2 enables the first control unit 12 or the second control unit 13 to control the backlight module to generate light sources with different light intensities according to different illumination values. Then, the display brightness of the display unit 11 changes along with the environmental light intensity. Therefore, the information showed on the display unit 11 can be seen clearly in a bright environment or in a dark environment.

In an embodiment, the display interface of the display unit 11 is a display interface defined by the Mobile Industry Processor Interface (MIPI) Alliance. The display unit 11 includes general purpose input/output (General purpose I/O, GPIO) pins to communicate with the first control unit 12 or the second control unit 13. In an embodiment, the second control unit 13 is connected to the sensing unit 14 via an integrated circuit (I2C) bus.

In an embodiment, the display brightness of the display unit 11 is controlled by the first control unit 12. The first control unit 12 in an operation mode adjusts the display brightness of the display unit 11 according to the brightness adjustment signal S2. As shown in FIG. 1, the second control unit 13 is coupled to the display unit 11 via the first control unit 12. When the second control unit 13 determines that the display brightness needs to be adjusted, the first control unit 12 sends the brightness adjustment signal S2 to the first control unit 12. The brightness adjustment signal S2 instructs the first control unit 12 to adjust the display brightness of the display unit 11 to the brightness corresponding to the first brightness range. Furthermore, in order to save the power consumption for the first control unit 12 in the operation mode, the first control unit 12 is configured to be entered to a sleep mode when needed. When the first control unit 12 enters the sleep mode and the second control unit 13 determines that the display brightness needs to be adjusted, the second control unit 13 awakes the first control unit 12 from the sleep mode according to the brightness adjustment signal S2. The second control unit 13 sends the brightness adjustment signal S2 to the first control unit 12. Then, the first control unit 12 in operation mode adjusts the display brightness of the display unit 11 according to the brightness adjustment signal S2.

Figure 3:
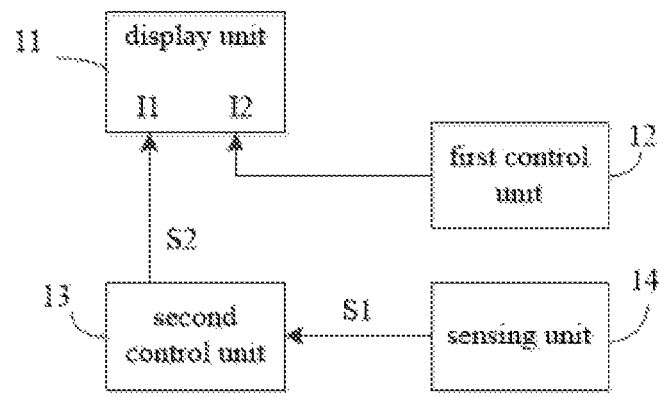
FIG. 3 is a circuit block diagram of an automatically brightness adjusting electronic device according to an embodiment.

FIG. 3 is a circuit block diagram of an automatically brightness adjusting electronic device according to an embodiment. In this embodiment, the display brightness of the display unit 12 is controlled by the second control unit 13. As shown in FIG. 3, the display unit 11 includes a control end I1 for controlling display brightness. The second control unit 13 is coupled to the control end I1 of the display unit 11. When the first brightness range is different from the second brightness range, regardless that the first control unit 12 is in the sleep mode or in the operation mode, the second control unit 13 generates the brightness adjustment signal S2 and sends the brightness adjustment signal S2 to the control end I1 of the display unit 11. Then, the backlight module of the display unit 11 is enabled to generate a light source with a corresponding brightness according to the brightness adjustment signal S2. On the other hand, in this embodiment, the first control unit 12 is used to control the display information on the display unit 12. As shown in FIG. 3, the display unit 11 includes a control end 12 for controlling the display information. The first control unit 12 is coupled to the control end 12 of the display unit 11. When the display information on the display unit 11 needs to be updated, the first control unit 12 sends a display information updating signal to the control end 12 of the display unit 11 to update the display information.

In an embodiment, the first control unit 12 is further coupled to the second control unit 13. The information about the current display brightness of the display unit 11 is stored in the second control unit 13. The first control unit 12 in operation mode reads the second control unit 13 to obtain the information about the current display brightness stored in the second control unit 13.

Figure 4:
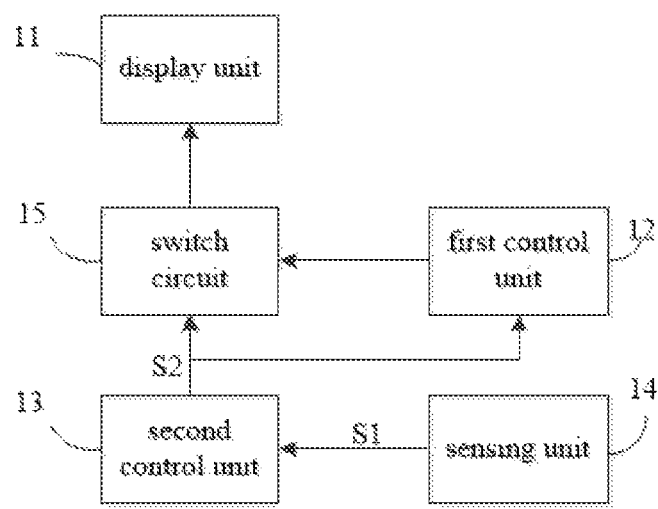
FIG. 4 is a circuit block diagram of an automatically brightness adjusting electronic device according to an embodiment.

FIG. 4 is a circuit block diagram of an automatically brightness adjusting electronic device according to an embodiment. In the second embodiment, the automatically brightness adjusting electronic device further includes a switch circuit 15. The switch circuit 15 is coupled to the display unit 11. The switch circuit 15 is switched between the first control unit 12 and the second control unit 13. The first control unit 12 or the second control unit 13 adjusts the display brightness of the display unit 11 via the switch circuit 15 according to the brightness adjustment signal S2. In detail, the switch circuit 15 is connected to the first control unit 12 or the second control unit 13 according to whether the first control unit 12 enters the sleep mode. When the first control unit 12 is in the sleep mode, the switch circuit 15 is coupled to the second control unit 13 and the display unit 11. At the time, the second control unit 13 sends the brightness adjustment signal S2 to the display unit 11 via the switch circuit 15. Then, the display brightness of the display unit 11 is adjusted. When the first control unit 12 is in the operation mode, the switch circuit 15 is coupled to the first control unit 12 and the display unit 11. At the time, the first control unit 12 receives the brightness adjustment signal S2 from the second control unit 13. The first control unit 12 adjusts the display brightness of the display unit 11 according to the brightness adjustment signal S2. Moreover, in the second embodiment, the second control unit 13 determines whether the first brightness range corresponding to the illumination value of the environmental light intensity is the same as the brightness range corresponding to the current display brightness of the display unit 11 according to the sensing signal S1 generated by the sensing unit 14. Then, whether to generate the brightness adjustment signal S2 is determined accordingly, and the detail description is omitted here.

In the second embodiment, both of the first control unit 12 and the second control unit 13 can update the display information on the display unit 11. When the first control unit 12 is in the operation mode, the first control unit 12 is coupled to the display unit 11 via the switch circuit 15 to send the display information updating signal to the display unit 11. Then, the display information on the display unit 11 is updated. When the first control unit 12 is in the sleep mode, the switch circuit 15 is switched to be coupled between the second control unit 13 and the display unit 11. The second control unit 13 sends the display information updating signal to the display unit 11. Therefore, the first control unit 12 has longer time in the sleep mode, and thus the power consumption of the automatically brightness adjusting electronic device 1 is further reduced. In practice, the switch circuit 15 is a multiplexer, a double switch or a single-pole double-throw switch.

Figure 5:
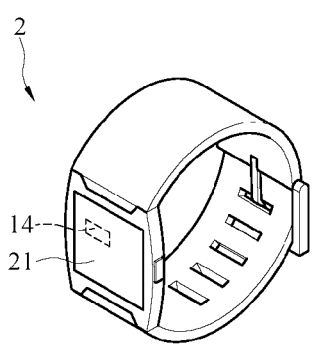
FIG. 5 is a schematic diagram showing the appearance of an automatically brightness adjusting electronic device according to an embodiment.

FIG. 5 is a schematic diagram showing the appearance of an automatically brightness adjusting electronic device according to an embodiment. In the embodiment, the automatically brightness adjusting electronic device 1 is an electronic watch. In other embodiments, the automatically brightness adjusting electronic device 1 is a notebook or a mobile phone, which is not limited herein. The electronic watch 2 has a watch surface 21. The display information displayed on the watch surface 21 of the display unit 11 includes time, date or physiological information of a user. In an embodiment, the sensing unit 14 is configured at the watch surface 21 to sense the change of the environmental light intensity. Therefore, when an environmental brightness changes from brighter to darker, the display brightness of the watch surface 21 also adjusts accordingly. When the environmental brightness changes from darker to brighter, the display brightness of the watch surface 21 also changes from darker to brighter accordingly. Therefore, the information showed on the watch surface 21 can be seen clearly under different environmental brightness. In an embodiment, the information displayed at the watch surface 21 of the electronic watch 2 is changed and updated by the first control unit 12 or the second control unit 13. In the embodiment, the second control unit 13 has low power consumption. Therefore, the second control unit 13 is configured to equip more function, such as a step counting function.

In sum, two control units are configured to the automatically brightness adjusting electronic device and the brightness adjusting method in embodiments. The first control unit with higher power consumption could stay longer in the sleep mode since the second control unit is also configured to execute the brightness adjustment function. The second control unit with lower power consumption could awake the first control unit to adjust the display brightness of the display unit, or the second control unit could adjust the display brightness directly. Thus, the power consumption is reduced, and the display brightness can be adjusted automatically.

Although the invention has been disclosed with reference to certain embodiments thereof, the disclosure is not for limiting the scope. Persons having ordinary skill in the art may make various modifications and changes without departing from the scope of the invention. Therefore, the scope of the appended claims should not be limited to the description of the embodiments described above.

What is claimed is:

1. An automatically brightness adjusting electronic device, comprising:
   a display unit with a display brightness;
   a sensing unit configured to sense an environmental light intensity;
   a first control unit coupled to the display unit;
   a second control unit coupled between the display unit and the sensing unit and being coupled to the display unit via the first control unit;
   a switch circuit, coupled to the display unit and switched between the first control unit and the second control unit, wherein the switch circuit comprises a double switch or a single-pole double-throw switch; and
   wherein when the first control unit is in a sleep mode and the second control unit determines that a brightness range of the environmental light intensity and a brightness range of the display brightness are different, the second control unit awakes the first control unit from the sleep mode to switch to an operation mode, and the first control unit in the operation mode adjusts the display brightness via the switch circuit according to the brightness range of the environmental light intensity.

2. The automatically brightness adjusting electronic device according to claim 1, wherein when the second control unit determines that the brightness range corresponding to the environmental light intensity is different from the brightness range corresponding to the display brightness, the second control unit generates a brightness adjustment signal, the first control unit in the operation mode adjusts the display brightness according to the brightness adjustment signal.

3. The automatically brightness adjusting electronic device according to claim 1, wherein the first control unit is a system-on-a-chip, and the second control unit is a microcontroller unit.

4. The automatically brightness adjusting electronic device according to claim 1, wherein the first control unit and the second control unit are different control chipsets on a same system-on-a-chip.

5. An automatically brightness adjusting electronic device, comprising:
   a display unit with a display brightness;
   a sensing unit configured to sense an environmental light intensity;
   a first control unit coupled to the display unit;
   a second control unit coupled to the first control unit and the sensing unit; and
   a switch circuit, coupled to the display unit and switched between the first control unit and the second control unit, wherein the switch circuit comprises a double switch or a single-pole double-throw switch;
   wherein when the first control unit is in a sleep mode and the second control unit determines that the display brightness needs to be adjusted, the second control unit does not awake the first control unit to switch to an operation mode, the second control unit adjusts the display brightness via the switch circuit without via the first control unit, wherein whe the first control unit is in a sleep mode, the second control unit determines that a brightness range of the enviornmental light intensity and a brightness range of the display brightness are different and awakes the first control unit from the sleep mode to switch to the operation mode to adjust the display brightness through the switch circuit.

6. The automatically brightness adjusting electronic device according to claim 5, wherein when the first control unit enters the sleep mode, the switch circuit is coupled to the second control unit and the display unit, and the second control unit adjusts the display brightness of the display unit via the switch circuit according to a brightness adjustment signal.

7. The automatically brightness adjusting electronic device according to claim 5, wherein when the first control unit enters the operation mode, the switch circuit is coupled to the first control unit and the display unit, the first control unit receives a brightness adjustment signal from the second control unit and adjusts the display brightness of the display unit via the switch circuit according to the brightness adjustment signal.

8. A brightness adjusting method, adapted to an electronic device, comprising:
    sensing an environmental light intensity;
    generating a brightness adjustment signal according to the environmental light intensity via a second control unit;
    adjusting a display brightness of a display unit according to the brightness adjustment signal via a first control unit through a switch circuit comprising a double switch or a single-pole double-throw switch coupled to the display unit and switched between the first control unit and the second control unit when the first control unit is in an operation mode; and
    when the first control unit is in a sleep mode, the second control unit determines that a brightness range of the enviornmental light intensity and a brightmess range of the display brightness are different and awakes the first control unit from the sleep mode to switch to the operation mode to adjust the display brightness through the switch circuit..

9. The brightness adjusting method according to claim 8, wherein when the second control unit determines that a first brightness range corresponding to the environmental light intensity and a second brightness range corresponding to the display brightness are different, the second control unit generates the brightness adjustment signal.

\* \* \* \* \*